(12) United States Patent
Plaquin et al.

(10) Patent No.: US 11,885,281 B2
(45) Date of Patent: Jan. 30, 2024

(54) THRUST REVERSER WITH FLAPS CONTROLLED BY A MECHANISM EQUIPPED WITH AERONAUTICAL BELLCRANKS

(71) Applicant: SAFRAN NACELLES, Gonfreville-l'Orcher (FR)

(72) Inventors: Josse Plaquin, Moissy-Cramayel (FR); Cedric François Pierre Renault, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 2 days.

(21) Appl. No.: 17/770,900

(22) PCT Filed: Oct. 20, 2020

(86) PCT No.: PCT/FR2020/051885
§ 371 (c)(1),
(2) Date: Apr. 21, 2022

(87) PCT Pub. No.: WO2021/079054
PCT Pub. Date: Apr. 29, 2021

(65) Prior Publication Data
US 2022/0397078 A1 Dec. 15, 2022

(30) Foreign Application Priority Data
Oct. 25, 2019 (FR) ...................................... 19 11975

(51) Int. Cl.
*F02K 1/72* (2006.01)
*F02K 1/76* (2006.01)

(52) U.S. Cl.
CPC ................. *F02K 1/72* (2013.01); *F02K 1/763* (2013.01); *F05D 2250/34* (2013.01); *F05D 2260/50* (2013.01)

(58) Field of Classification Search
CPC .................................. F02K 1/72; F02K 1/763
See application file for complete search history.

(56) References Cited

U.S. PATENT DOCUMENTS 3,262,268 A * 7/1966 Beavers .................... F02K 1/72
239/265.19
3,503,211 A * 3/1970 Leonard .................... F02K 1/72
239/265.29

(Continued)

FOREIGN PATENT DOCUMENTS

EP 3 051 112 A1 8/2016
EP 3 228 853 A1 10/2017

(Continued)

OTHER PUBLICATIONS

International Search Report dated Feb. 9, 2021 in PCT/FR2020/051885 filed Oct. 20, 2020, 3 pages.

(Continued)

*Primary Examiner* — Katheryn A Malatek
(74) *Attorney, Agent, or Firm* — Oblon, McClelland, Maier & Neustadt, L.L.P.

(57) ABSTRACT

An aeronautical thrust reverser including a sliding cowl, shutter flaps and deflection cascades. The reverser includes, for each flap, a return member hinged to the sliding cowl, to a driving connecting rod itself hinged to a front frame of the reverser, and to a return connecting rod itself hinged to the flap, the latter being moreover hinged by its rear end to the sliding cowl. The return member, the driving connecting rod and the return connecting rod form an actuation system capable of opening the secondary flow duct in a direct thrust configuration.

10 Claims, 4 Drawing Sheets

(56) References Cited

U.S. PATENT DOCUMENTS

| | | | |
|---|---|---|---|
| 2013/0067884 A1* | 3/2013 | Bhatt | F02K 1/72 60/204 |
| 2014/0150403 A1* | 6/2014 | Stuart | F02K 1/72 60/204 |
| 2015/0176528 A1 | 6/2015 | Peyron | |
| 2016/0245228 A1 | 8/2016 | Gormley | |
| 2016/0245229 A1 | 8/2016 | Peyron et al. | |
| 2017/0292474 A1 | 10/2017 | Davies | |
| 2020/0025134 A1 | 1/2020 | Gormley | |

FOREIGN PATENT DOCUMENTS

| | | |
|---|---|---|
| FR | 2 982 323 A1 | 5/2013 |
| FR | 2 994 586 A1 | 2/2014 |

OTHER PUBLICATIONS

Preliminary French Search Report dated Jun. 23, 2020 in French Patent Application No. 1911975 filed Oct. 25, 2019, 2 pages (with Translation of Category of Cited Documents).

\* cited by examiner

THRUST REVERSER WITH FLAPS CONTROLLED BY A MECHANISM EQUIPPED WITH AERONAUTICAL BELLCRANKS

TECHNICAL FIELD

The invention relates to the field of thrust reversers for an aircraft propulsion unit, and more specifically to the field of cascade reversers.

PRIOR ART

A cascade thrust reverser generally comprises an outer structure which is movable between a closed position and an open position. The movement of the movable outer structure between these positions generally consists of a translation of this structure along an axis substantially parallel to the axis of the engine.

In the closed position, the movable outer structure is configured to guide a fluid flow in the propulsion unit in the direction of an ejection nozzle so as to generate a thrust used to propel the aircraft.

In the open position, the movable outer structure clears a radial opening in which the cascade vanes are placed, so as to redirect a portion of the fluid flow forward of the propulsion unit and thus generate a braking counter-thrust.

Cascade reversers generally equip propulsion units equipped with a bypass turbojet engine. In such a propulsion unit, a primary flow circulates in a primary flow path passing through the gas generator of the turbojet engine and a secondary flow circulates in a secondary flow path surrounding the gas generator, the secondary flow path being delimited radially inwards by a fixed inner structure and radially outwards by the movable outer structure.

To generate a counter-thrust from the secondary flow, a portion of this flow is typically directed towards the cascade vanes by shutter flaps deployed in the secondary flow path. In the direct thrust configuration, these flaps are retracted against the wall or within a housing of the movable outer structure.

In a conventional architecture, the deployment and the retraction of the shutter flaps are performed by connecting rods connected on the one hand to the flaps and on the other hand to the fixed inner structure so as to be driven by the movement of the movable outer structure.

In the direct thrust configuration, such connecting rods extend in the secondary flow path, radially between the fixed inner structure and the movable outer structure, which disturbs the secondary flow and degrades the performances of the propulsion unit.

DISCLOSURE OF THE INVENTION

To overcome this problem, an object of the invention is a thrust reverser for an aircraft propulsion system, this reverser comprising a fixed outer structure, a movable outer structure, at least one shutter flap and a control mechanism configured to make the reverser switch between:

a direct thrust configuration in which the movable outer structure is in a closed position and the flap is in a retracted position so as to channel a fluid flow in a conduit delimited radially outwards by the movable outer structure, and a thrust reversal configuration in which the movable outer structure is in an open position clearing a radial opening, and in which the flap is in a deployed position so as to divert at least one portion of said fluid flow towards said radial opening.

According to the invention, the control mechanism comprises at least one transmission member which is:

connected to the movable outer structure by a first articulation so as to enable a rotation of the transmission member relative to the movable outer structure about an axis of rotation of this first articulation, connected to the fixed outer structure by a first connecting member configured so as to move the transmission member in rotation about the axis of rotation of the first articulation in a first direction when the movable outer structure is moved towards the open position and in a second direction when the movable outer structure is moved towards the closed position, connected to the flap by a second connecting member configured so as to move the flap towards the deployed position when the transmission member is moved in said first direction and towards the retracted position when the transmission member is moved in said second direction.

Thus, the invention allows controlling the position of the flap without any means for connecting the flap with an inner fixed structure delimiting said fluid flow duct radially inwards.

Thus, it is possible to prevent a portion of the control mechanism from extending into this duct in the direct thrust configuration, which in particular allows reducing the fluid flow disturbances in direct thrust and reducing fuel consumption.

In one embodiment, the fluid flow duct may also be delimited radially outwards by an inner surface of the flap.

In particular, this allows simplifying the architecture of the reverser, the flap could be simply folded down against the movable outer structure.

Preferably, said first connecting member may comprise at least one drive connecting rod, the drive connecting rod being articulated on the one hand to the transmission member and on the other hand to the fixed outer structure.

The use of such a drive connecting rod allows simplifying the geometry and reducing the dimensions and the mass of the transmission member.

Thus, for example, the transmission member may be in the form of a bellcrank.

In one embodiment, the drive connecting rod may be a telescopic connecting rod.

A telescopic drive connecting rod allows delaying the deployment of the flap when the reverser switches from the direct thrust configuration to the thrust reversal one, and completing the retraction thereof before the movable outer structure reaches the closed position when the reverser switches from the thrust reversal configuration into the direct thrust one.

This results in a reduction in the amplitude of the total movement of the pivoting transmission member during a change in the configuration of the reverser, which allows reducing the relative dimensions and therefore the mass of the transmission member and of the first connecting member, and reducing the risk of interference of the transmission member and/or of the first connecting member with the flap.

In one embodiment, the telescopic connecting rod may comprise a guide part and a sliding part within an inner housing of the guide part, the telescopic connecting rod being articulated to the transmission member by the guide part, the telescopic connecting rod being articulated to the fixed outer structure by a distal end of the sliding part.

Such a configuration of the telescopic connecting rod relative to the fixed outer structure results in an orientation of the connecting rod in a direction in which the sliding part is directed upstream and the guide part downstream with respect to the direction of flow of the fluid in the duct, in particular in the thrust reversal configuration at least for the portion of the fluid directed towards the flap.

Thus, it is possible to improve the protection of the telescopic connecting rod by limiting the introduction of dust into the inner housing of the guide part.

In one embodiment, the flap may comprise a front end and a rear end configured so that said fluid flow circulates in the duct in a direction from this front end towards this rear end in the direct thrust configuration, the rear end of the flap being articulated on the movable outer structure.

The articulation of the flap by its rear end allows simplifying the overall architecture of the control mechanism of the flap.

In particular, this allows avoiding any risk of interference of the transmission member with the flap, which would require forming an opening in the flap, or forming it in two portions.

Consequently, a flap thus articulated allows using a continuous one-piece flap, or more generally a conventional non-split flap.

Preferably, the flap may therefore form a continuous one-piece structure.

Such a flap allows improving thrust reversal performance by maximising the deflection surface, reducing its manufacturing cost, facilitating the addition of an acoustic treatment member thereto, reducing its mass and consequently improving the aerodynamic performances of the propulsion unit.

In one embodiment, said second connecting member may comprise at least one connecting rod, the connecting rod being articulated on the one hand to the transmission member and on the other hand to the flap.

The use of such a connecting rod allows simplifying the geometry and reducing the dimensions and the mass of the transmission member.

Preferably, the control mechanism may be configured so that the transmission member is contained within a space delimited radially inwards by the flap both in the direct thrust configuration, in the thrust reversal configuration and during a switch from one of these configurations into the other.

Such a control mechanism allows using a scooping flap as described hereinabove and profiting from the aforementioned advantages conferred by such a flap.

In one embodiment, the transmission member may be articulated to said first connecting member by a second articulation and be articulated to said second connecting member by a third articulation, the first articulation and the second articulation defining a first transmission direction, the first articulation and the third articulation defining a second transmission direction, the first and second transmission directions being secant to each other.

According to a first variant of this embodiment, the reverser may be configured so that, in the thrust reversal configuration, the first transmission direction is substantially parallel to a direction along which the first connecting member extends.

According to a second variant of this embodiment, the reverser may be configured so that, in the thrust reversal configuration, the second transmission direction is substantially parallel to a direction along which the second connecting member extends.

These first and second variants could be combined together.

Such variants and their combination allow obtaining substantially linear force paths, which allows improving the robustness of the reverser in the thrust reversal configuration and simplifying and reducing the mass of the control mechanism.

In one embodiment, the reverser may comprise movable cascade vanes.

The invention also relates to a propulsion unit for an aircraft, this propulsion unit possibly comprising a reverser as described hereinabove.

Other advantages and features of the invention will appear upon reading the following detailed, non-limiting description.

BRIEF DESCRIPTION OF THE DRAWINGS

The following detailed description refers to the appended drawings wherein.

DETAILED DESCRIPTION OF EMBODIMENTS

Figure 1:
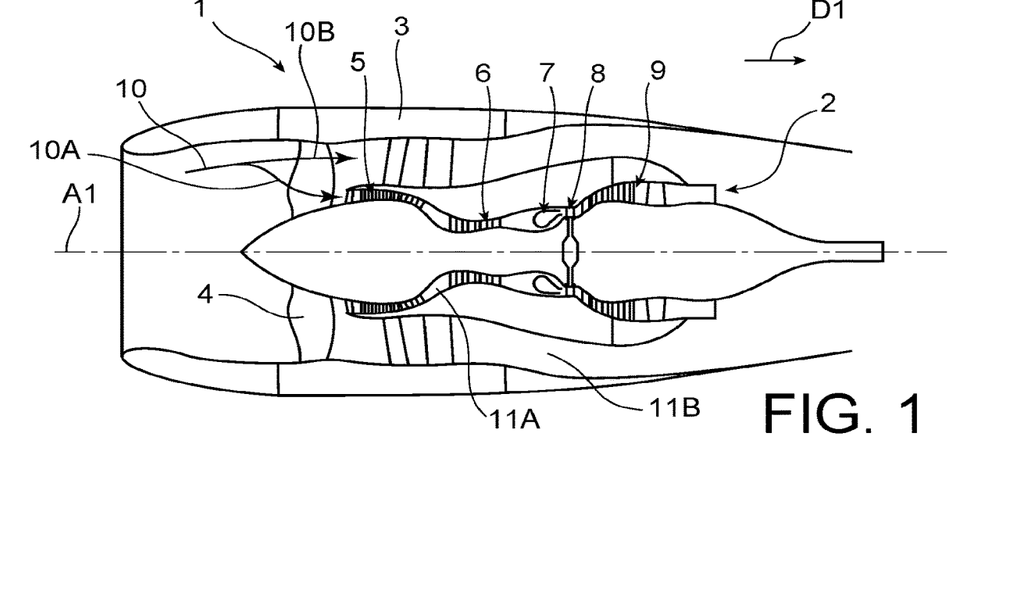
FIG. 1 is a schematic view in axial section of an aircraft propulsion unit.

In FIG. 1, an aircraft propulsion unit 1 is represented comprising a turbomachine 2 streamlined by a nacelle 3. In this example, the turbomachine 2 is a twin-spool bypass turbojet engine.

Next, the terms "upstream", "downstream", "front" and "rear" are defined with respect to a direction D1 of gas flow through the propulsion unit 1 when the latter exerts a thrust. The turbojet engine 2 has a longitudinal central axis A1 around which its different components extend, in this instance, from upstream to downstream of the turbojet engine 2, a fan 4, a low-pressure compressor 5, a high-pressure compressor 6, a combustion chamber 7, a high-pressure turbine 8 and a low-pressure turbine 9. The compressors 5 and 6, the combustion chamber 7 and the turbines 8 and 9 form a gas generator.

During the operation of the turbojet engine 2, an air flow 10 enters the propulsion unit 1 via an air inlet upstream of the nacelle 3, crosses the fan 4 and is then split into a central primary flow 10A and a secondary flow 10B. The primary stream 10A flows in a main gas circulation flow path 11A passing through the compressors 5 and 6, the combustion chamber 7 and the turbines 8 and 9. In turn, the secondary flow 10B flows in a secondary flow path 11B surrounding the gas generator and delimited radially outwards by the nacelle 3.

The invention relates to a thrust reverser 20 as illustrated in FIGS. 2 to 7 for reversing the thrust generated by the propulsion unit 1.

The reverser 20 comprises on the one hand elements fixed relative to a stator of the turbojet engine 2, among which a fixed inner structure 21 and a fixed outer structure 22, the latter forming a front frame.

This reverser 20 further comprises elements movable relative to the aforementioned fixed elements, among which a movable outer structure 25 forming a movable cowl, shutter flaps 26 and cascade vanes 27.

The movement of these movable elements relative to the fixed elements allows modifying the configuration of the reverser 20 as described hereinafter.

In a manner known per se, the shutter flaps 26 are distributed circumferentially around a longitudinal central axis of the reverser 20 which corresponds in this example to the axis A1 of the turbojet engine 2.

Figure 2:
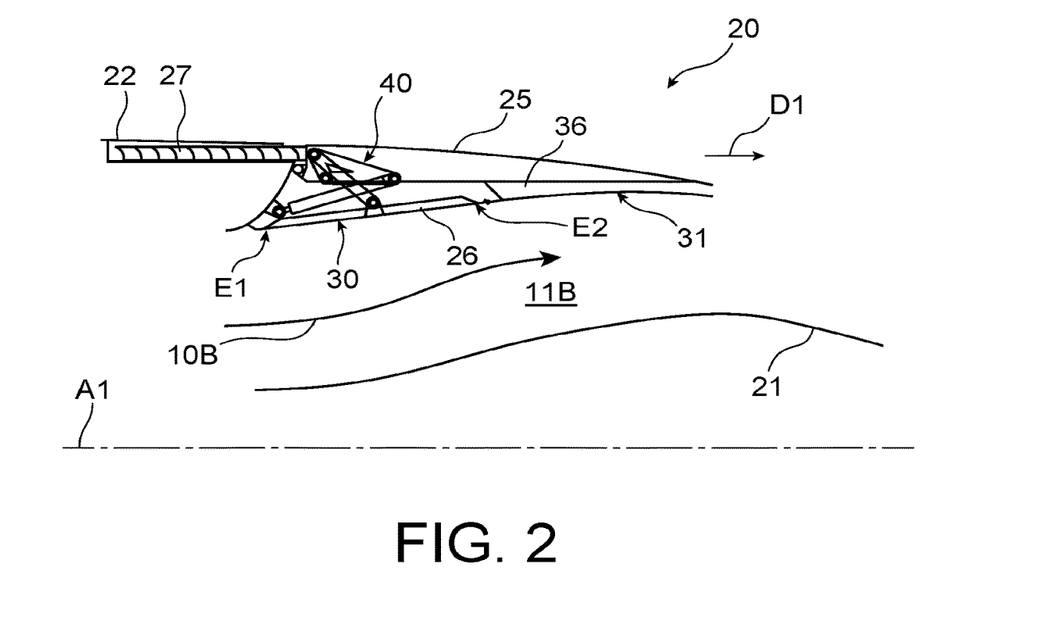
FIG. 2 is a schematic half-view in axial section of a thrust reverser in accordance with the invention, in a direct thrust configuration.

FIG. 2 shows the reverser 20 in a direct thrust configuration, also called direct jet. In this configuration, the movable cowl 25 is in a closed position in which it bears tightly axially against the front frame 22. The cascade vanes 27, secured to the movable cowl 25, are received within a housing of the front frame 22.

In direct jet, the movable cowl 25 and the fixed inner structure 21 radially delimit therebetween a duct forming a downstream portion of the secondary flow path 11B.

In this configuration, the shutter flaps 26 are in a retracted position in order not to block the secondary flow path 11B. More specifically, the flaps 26 bear against the movable cowl 25 so that an inner surface 30 of the flaps 26 delimits radially outwards a respective portion of the secondary flow path 11B.

The movable cowl 25 forms an inner surface 31 delimiting radially outwards another portion of the secondary flow path 11B, downstream of the flaps 26.

To limit the disturbances of the secondary flow 10B in direct jet, the shutter flaps 26 and the movable cowl 25 are arranged so as to reduce the discontinuity between the inner surface 30 of the flaps 26 and the inner surface 31 of the movable cowl 25. To this end, in this example, the inner surface 31 of the movable cowl 25 is formed by a panel 36 forming an overthickness so that the inner surface 30 of the flaps 26 and the inner surface 31 of the movable cowl 25 are flush.

In the configuration of FIG. 2, the reverser 20 thus allows channelling the secondary flow 10B towards the rear of the propulsion unit 1 so that this flow 10B fully contributes to the propulsion of the aircraft.

Figure 7:
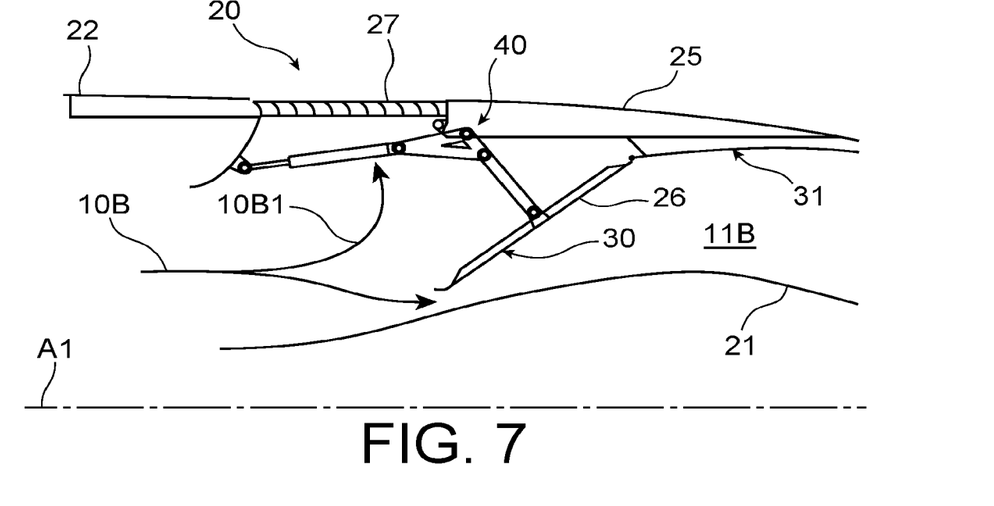
FIG. 7 is a schematic half-view in axial section of the reverser of FIG. 2, in a thrust reversal configuration.

FIG. 7 shows the reverser 20 in a thrust reversal configuration, also called a reverse jet. In this configuration, the movable cowl 25 is in an open position in which it clears a radial opening formed in this example by openings of the cascade vanes 27 which extend axially between the front frame 22 and the movable cowl 25.

In reverse jet, the shutter flaps 26 are in a deployed position so as to divert a portion 10B1 of the secondary flow 10B towards the cascade vanes 27. The portion 10B1 could substantially form the entire secondary flow 10B.

In the configuration of FIG. 7, the reverser 20 thus allows generating a counter-thrust for braking the aircraft from the secondary flow 10B.

To modify the configuration of the reverser 20, the latter comprises a mechanism for controlling the position of the movable cowl 25 and the position of the flaps 26.

In this example, the control mechanism conventionally comprises cylinders (not represented) to move the movable cowl 25 between the closed and open positions, this movement causing an identical movement of the cascade vanes 27 secured to the movable cowl 25. In another embodiment which is not represented, the switch from the direct thrust configuration into the thrust reversal configuration causes a differential movement of the cascade vanes 27 and of the movable cowl 25.

Moreover, the control mechanism comprises a plurality of actuation systems 40, described in detail hereinbelow, configured to modify the position of the shutter flaps 26 when the movable cowl 25 changes position.

Each of the actuation systems 40 is configured to modify the position of a respective shutter flap 26.

The following description refers to a single actuation system 40 and a single corresponding flap 26, and applies identically to each of the other actuation systems and corresponding flaps 26 not represented in FIGS. 2 to 8.

In general, the actuation system 40 is configured so that the movement of the movable cowl 25 from the closed position (FIG. 2) to the open position (FIG. 7) results in a movement of the shutter flap 26 from the retracted position to the deployed position.

Conversely, the actuation system 40 is configured so that the movement of the movable cowl 25 from the open position (FIG. 7) to the closed position (FIG. 2) results in a movement of this shutter flap 26 from the deployed position to retracted position.

Figure 8:
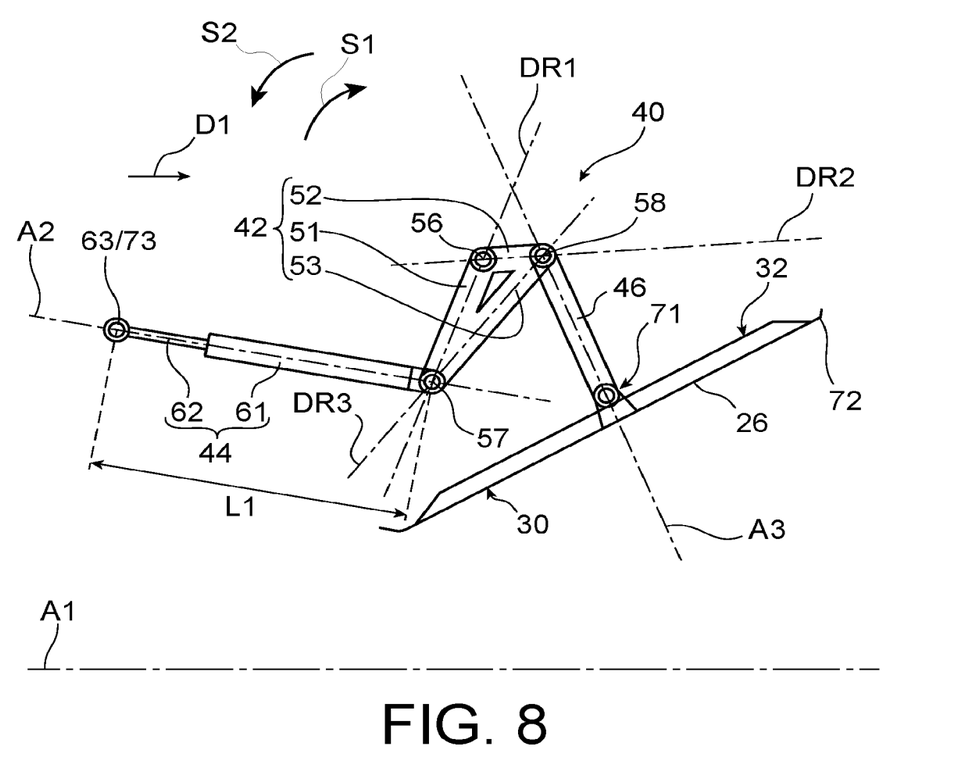
FIG. 8 is a schematic view of an actuation system and of a flap of the reverser of FIG. 2, in said fourth intermediate configuration.

Referring to FIG. 8, the actuation system 40 comprises a transmission member 42, a first connecting member 44 and a second connecting member 46.

The transmission member 42 comprises three sections 51, 52 and 53 connected together so as to form a triangle.

In other words, these sections 51, 52 and 53 respectively extend along a first, a second and a third transmission direction DR1, DR2 and DR3, so that the transmission directions DR1, DR2 and DR3 are secant to each other.

The transmission member 42 is configured to be connected to other elements of the reverser 20 by three distinct articulations 56, 57 and 58, respectively called first, second and third articulation.

In this example, each of the articulations 56, 57 and 58 forms an axis ensuring a rotational guidance of the transmission member 42 about a respective axis of rotation of this axis.

To this end, the transmission member 42 comprises at each vertex of the triangle formed thereby a cooperation element (not represented) such as an orifice cooperating with a respective one of these articulations 56, 57 and 58. In this instance, the vertex formed by the sections 51 and 52 comprises a first element for cooperation with the first articulation 56, the vertex formed by the sections 51 and 53 comprises a second element for cooperation with the second articulation 57, and the vertex formed by the sections 52 and 53 comprises a third element for cooperating with the third articulation 58.

Each of the sections 51, 52 and 53 forms a force transmission element between two of the articulations 56, 57 and 58.

Such a transmission member 42 forms a connecting rod with three articulations known as "bellcrank".

The transmission member 42 is connected to the first connecting member by the second articulation 57.

In this example, the first connecting member 44 is a telescopic drive connecting rod extending along a direction A2.

The telescopic connecting rod 44 is a passive member which comprises a guide part 61 such as a tube, called telescopic tube, and a sliding part 62 such as a rod, called telescopic rod, the latter being received within an inner housing of the telescopic tube 61.

Each of the telescopic tube 61 and the telescopic rod 62 comprises a proximal end and a distal end. The proximal end of the telescopic rod 62 is housed within the telescopic tube 61 whereas its distal end 63 extends outside the latter while defining a first end of the telescopic connecting rod 44. The distal end of the telescopic tube 61 defines a second end of the telescopic connecting rod 44. The proximal end of the telescopic tube 61, opposite to its distal end, is therefore located according to the direction A2 between the first and second ends of the telescopic rod 44.

The distance between the first and second ends of the telescopic connecting rod 44, i.e. between the distal end of the telescopic tube 61 and the distal end of the telescopic rod 62, defines a length L1.

The value of this length L1 varies according to the position of the telescopic rod 62 which can be moved in translation relative to the telescopic tube 61 along the direction A2, between a position in which the telescopic connecting rod 44 is retracted and a position in which it is deployed, thus defining a stroke of the telescopic connecting rod 44. In this example, the telescopic connecting rod 44 comprises a stop (not represented) limiting the deployment thereof so as to define a maximum value of the length L1 corresponding to a maximum deployment of the connecting rod 44.

To connect the transmission member 42 to the telescopic connecting rod 44, the distal end of the telescopic tube 61 comprises an element (not represented) for cooperation with the second articulation 57 so as to enable a rotation of the transmission member 42 relative to the telescopic tube 61, and therefore relative to the telescopic connecting rod 44, about the axis of rotation of this second articulation 57. The axis of rotation of the second articulation 57 is substantially perpendicular to the direction A2.

Moreover, the transmission member 42 is connected to the second connecting member 46 by the third articulation 58.

In this example, the second connecting member 46 is a conventional connecting rod, called connecting rod, provided with two cooperation elements (not represented).

One of said cooperation elements of the connecting rod 46 cooperates with the third articulation 58 so as to enable a rotation of the transmission member 42 relative to connecting rod 46 about the axis of rotation of this third articulation 58.

The other one of said cooperation elements of the connecting rod 46 is configured to connect the connecting rod 46 to the flap 26 by a fourth articulation 71 formed in this example by an axis ensuring a rotational guidance of the connecting rod 46 about an axis of rotation of this axis 71. The flap 26 comprises a corresponding cooperating element (not represented) mounted on this flap 26. In this example, this cooperation element is a hinge element of the U-like shaped ear type fixedly receiving the axis forming the fourth articulation 71, this hinge element projecting with respect to an outer surface 32 of the flap 26 and being mounted on a central portion thereof, between its front end E1 and its rear end E2.

Thus, the transmission member 42 is in this example connected to the flap 26 via the connecting rod 46.

The actuation system 40 that has just been described is mounted on the reverser 20 as described hereinafter with reference to FIG. 6.

The transmission member 42 is connected to the movable cowl 25 by the first articulation 56 so as to enable a rotation of the transmission member 42 relative to the movable cowl 25 about the axis of rotation of this first articulation 56. The axis forming this first articulation 56 is secured to the movable cowl 25.

It defines a front end E1 and a rear end E2 of the flap 26. Referring to FIG. 2, the flap 26 is configured so that the secondary flow 10B circulates in the secondary flow path 11B in a direction from the front end E1 towards the rear end E2 of this flap 26 when the reverser 20 is in the direct thrust configuration.

Figure 6:
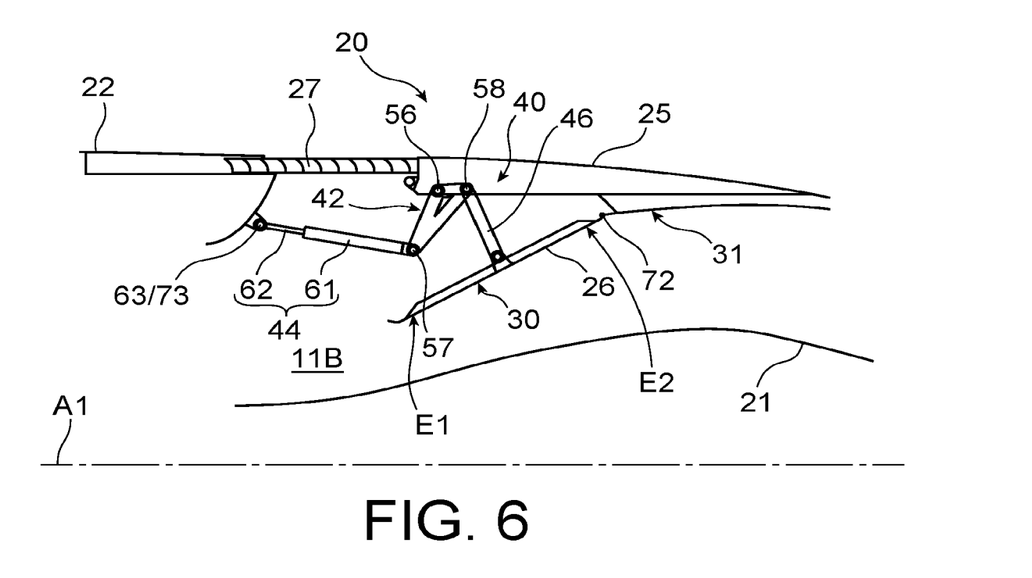
FIG. 6 is a schematic half-view in axial section of the reverser of FIG. 2, in a fourth intermediate configuration.

Referring to FIG. 6, the flap 26 is connected by a rear end E2 to the movable outer structure 25 by a fifth articulation 72 so as to enable a rotation of the flap 26 relative to the movable outer structure 25 about an axis of rotation of this fifth articulation 72. In this example, the fifth articulation 72 is formed by an axis secured to the movable cowl 25 ensuring a rotational guidance of the flap 26 about an axis of rotation of this axis 72.

The telescopic rod 62 is connected to the front frame 22 by a sixth articulation 73, by cooperation of a cooperation element (not represented) of the distal end 63 of this rod 62, so as to enable a rotation of the telescopic rod 62 and therefore of the telescopic connecting rod 44 relative to the fixed outer structure 22 about an axis of rotation of the sixth articulation 73. This cooperation element is herein an orifice receiving the sixth articulation 73, the latter also being formed by an axis, secured to the fixed outer structure 22, so as to ensure a rotational guidance of the telescopic rod 62 about an axis of rotation of this sixth articulation 73.

In this example, the axes of rotation of the articulations 56, 57, 58, 71, 72 and 73 are substantially parallel to each other and substantially perpendicular to the longitudinal central axis A1.

The flap 26 and the actuation system 40 thus mounted on the reverser 20 allow modifying the position of the flap 26 when the movable cowl 25 changes position by simple mechanical drive of the flap 26.

FIGS. 2 to 7 show the reverser 20 in different configurations, in particular in direct thrust (FIG. 2), in thrust reversal (FIG. 7) and in intermediate configurations (FIGS. 3 to 6) allowing illustrating the kinematics of the actuation system 40.

In this particular example, when the reverser 20 switches from the direct thrust configuration (FIG. 2) to the thrust reversal configuration (FIG. 7), the configurations of FIGS. 2 to 7 respectively correspond to a position of the movable outer structure 25 having completed an opening stroke by 0%, 19%, 25%, 40%, 75% and 100%.

Conversely, when the reverser 20 switches from the thrust reversal configuration (FIG. 7) to the direct thrust configuration (FIG. 2), the configurations of FIGS. 2 to 7 respectively correspond to a position of the movable outer structure 25 having completed a closure stroke by 100%, 81%, 75%, 60%, 25% and 0%.

The following description relates to the opening stroke, and applies by analogy to the closure stroke. All of the references in FIG. 8 not being replicated in each of FIGS. 2 to 7, in the following, reference is made by default to FIG. 8.

In the direct thrust configuration (FIG. 2), the telescopic connecting rod 44 is retracted. The transmission member 42 is oriented so that the transmission direction DR1 passing through the first and second articulations 56 and 57 is substantially parallel to the longitudinal central axis A1 and so that the first articulation 56 is upstream with respect to the second articulation 57. In turn, the telescopic connecting rod 44 is oriented so that the direction A2 forms with the transmission direction DR1 an angle smaller than 45°, the distal end 63 of the telescopic rod 62 being upstream with respect to the second articulation 57.

When the opening stroke is initiated, the movement of the movable cowl 25 exerts on said first cooperation element of the transmission member 42, via the first articulation 56, a drive force in the direction D1. This force is communicated to the telescopic tube 61 via the section 51 and the second articulation 57.

Figure 3:
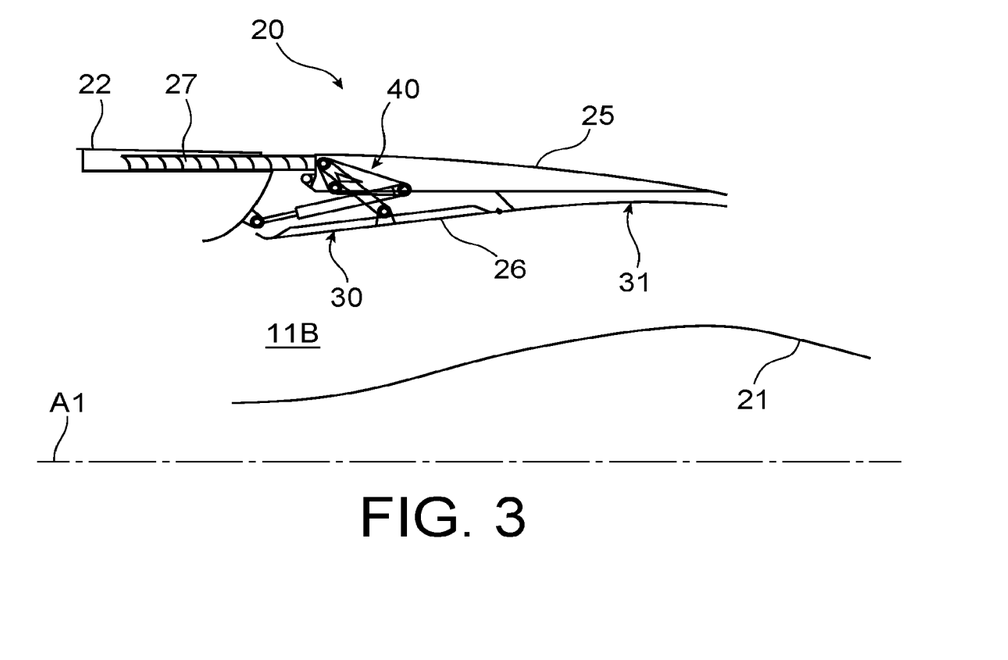
FIG. 3 is a schematic half-view in axial section of the reverser of FIG. 2, in a first intermediate configuration.
Figure 4:
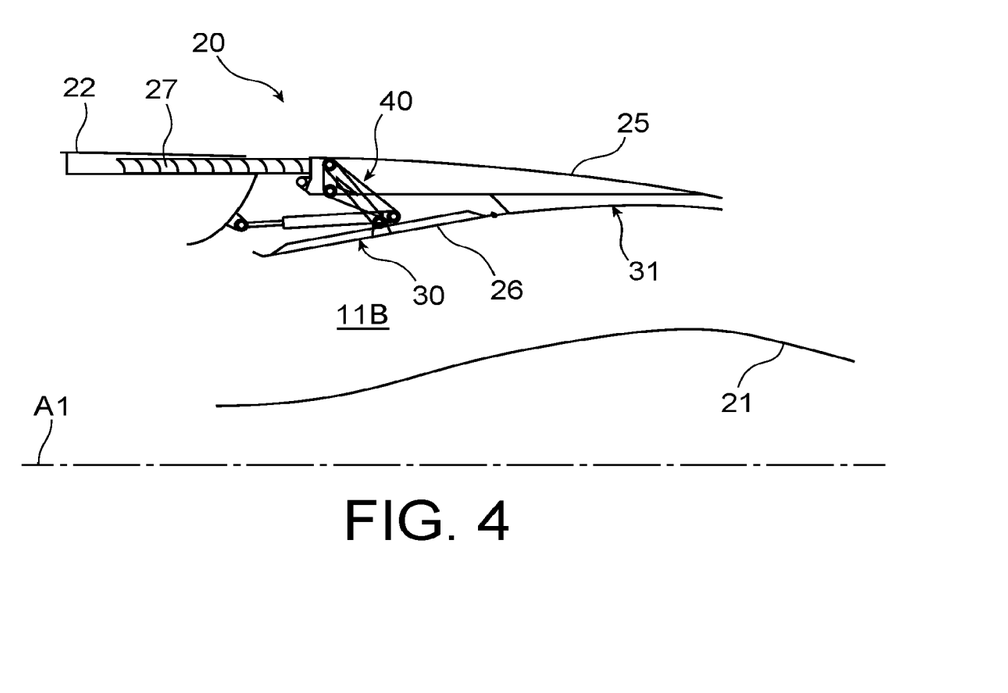
FIG. 4 is a schematic half-view in axial section of the reverser of FIG. 2, in a second intermediate configuration.
Figure 5:
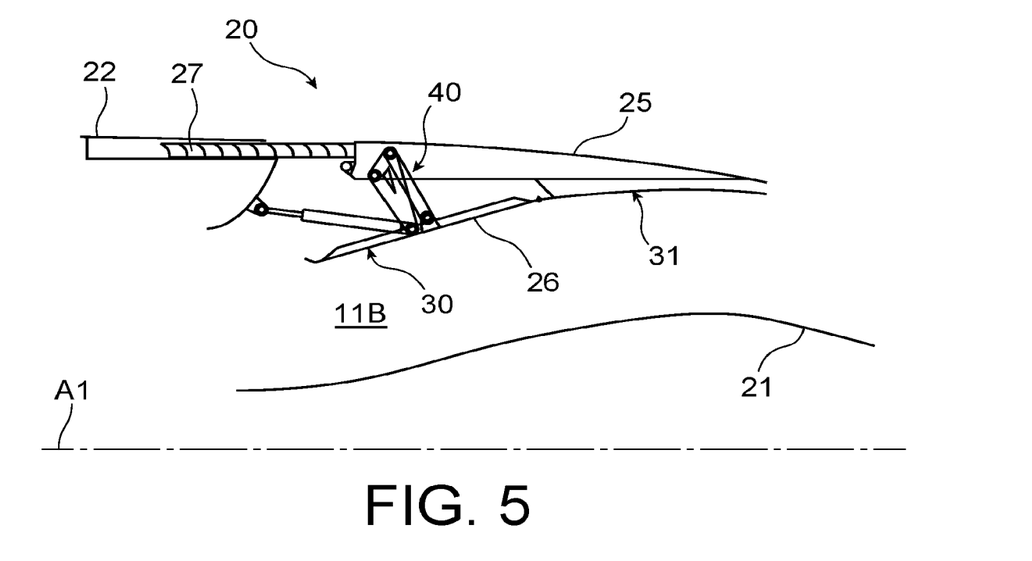
FIG. 5 is a schematic half-view in axial section of the reverser of FIG. 2, in a third intermediate configuration.

Given the configuration of the actuation system 40 when the reverser 20 is in the direct thrust configuration (FIG. 2), the movement of the movable cowl 25 thus causes the deployment of the telescopic connecting rod 44 up to the configuration of FIG. 3 in which this connecting rod 44 is fully deployed.

The movement of the movable cowl 25 from the closed position of FIG. 2 to the position of FIG. 3 defines a first phase of the opening stroke.

During this first phase, neither the transmission member 42 nor the flap 26 are driven in rotation relative to the movable cowl 25, considering the deployment of the telescopic connecting rod 44 which delays the deployment of the flap 26.

A second phase of the opening stroke is accomplished during the movement of the movable cowl 25 from the configuration of FIG. 3 to that one of FIG. 7.

During this second phase, the telescopic connecting rod 44 remains fully deployed and behaves like a standard connecting rod, by transmitting the movement in the direction D1 from the distal end of the telescopic tube 61 to the distal end 63 of the telescopic rod 62.

The movement of the movable cowl 25 still exerts, during this second phase of the opening stroke, a drive force of the transmission member 42 in the direction D1, via the first articulation 56. This force is communicated to the telescopic connecting rod 44 via the section 51 and the second articulation 57.

The telescopic connecting rod 44 being fully deployed, the respective orientation of the section 51 according to the first transmission direction DR1 and of the connecting rod 44 according to the direction A2 enables the transmission member 42 to be driven in rotation relative to the movable cowl 25, in a first direction of rotation S1 about the axis of rotation of the first articulation 56.

The rotation of the transmission member 42 results from the mutual action:
on the one hand, of the drive force exerted on the transmission member 42 via the first articulation 56, which is exerted on said first cooperation element of the transmission member 42 in a direction parallel to the longitudinal central axis A1 and in the same direction as D1,
on the other hand, a corresponding drive force exerted on the transmission member 42 via the second articulation 57, which is exerted on said second cooperation element of the transmission member 42 in a direction parallel to the longitudinal central axis A1 and a direction opposite to the direction D1.

The rotation of the transmission member 42 during the opening stroke causes a movement of the third articulation 58, in rotation about the axis of rotation of the first articulation 56, resulting in a displacement of the connecting rod 46 so that the end of this connecting rod 46 articulated to the flap 26 moves according to a path oriented radially inwards.

To the extent that the flap 26 is articulated to the movable cowl 25 by its rear end E2 via the fifth articulation 72, the rotation of the transmission member 42 during the opening stroke causes a deployment of the flap 26.

When the reverser 20 reaches the thrust reversal configuration (FIG. 7), the first transmission direction DR1 is substantially parallel to the direction A2 of the telescopic connecting rod 44 so that forces could transit linearly between the movable cowl 25 and the front frame 22 via the telescopic connecting rod 44 and the section 51 of the transmission member 42.

In addition, in this thrust reversal configuration, the second transmission direction DR2 is substantially parallel to a direction A3 along which the connecting rod 46 extends so that forces could transit linearly between the flap 26 and the movable cowl 25 via the transmission member 42 and the section 52 of the transmission member 42. The flap 26 further extends in a plane substantially perpendicular to the direction A3 of the connecting rod 46.

This results in an improvement of the force paths of the flap 26 and of the actuation system 40 when the reverser 20 is in the thrust reversal configuration.

As deduced from FIGS. 2 to 7 and from the preceding description, the actuation system 40 remains in this example entirely contained within a space delimited radially inwards by the flap 26, that being so in each of the configurations of the reverser 20. Thus, it is possible to use a continuous one-piece flap 26, i.e. containing no opening intended to be crossed during some phases by a portion of the actuation system 40.

The reverser 20 may comprise a fairing (not represented) configured to protect the telescopic connecting rod 44 from projections that might damage its mechanism, and/or to reduce the disturbance of the portion 10B1 of the secondary flow 10B redirected towards the cascade vanes 27 in the thrust reversal configuration.

The preceding description is in no way limiting. For example, in a non-represented embodiment, the cascade vanes 27 are fixed, secured to the fixed outer structure 22. In another non-represented embodiment, the drive connecting rod 44 is not a telescopic connecting rod but a conventional connecting rod with two articulations similar to the connecting rod 46.

The invention claimed is:

1. A thrust reverser for an aircraft propulsion system, said thrust reverser comprising:
a fixed outer structure,
a movable outer structure,
at least one shutter flap comprising a rear end articulated on the movable outer structure, and
a control mechanism configured to make the thrust reverser switch between:
a direct thrust configuration wherein the movable outer structure is in a closed position and the at least one shutter flap is in a retracted position so as to channel a fluid flow in a conduit delimited radially outwards by the movable outer structure, and
a thrust reversal configuration wherein the movable outer structure is in an open position clearing a radial opening, and wherein the at least one shutter flap is in a deployed position so as to divert at least one portion of said fluid flow towards said radial opening,
wherein the control mechanism comprises at least one transmission member including first, second and third sections connected together so as to form a triangle and extending respectively along first, second and third return directions secant to each other, the first and second sections forming a vertex comprising a first cooperation element, the first and third sections forming a vertex comprising a second cooperation element, and the second and third sections forming a vertex comprising a third cooperation element, the at least one transmission member being:
- connected to the movable outer structure by a first articulation cooperating with said first cooperation element so as to enable a rotation of the at least one transmission member relative to the movable outer structure about an axis of rotation of said first articulation,
- connected to the fixed outer structure by a first connecting member, the at least one transmission member being articulated to said first connecting member by a second articulation cooperating with the second cooperation element, the first connecting member being configured so as to move the at least one transmission member in rotation about the axis of rotation of the first articulation in a first direction when the movable outer structure is moved towards the open position and in a second direction when the movable outer structure is moved towards the closed position, and
- connected to the at least one shutter flap by a second connecting member, the at least one transmission member being articulated to said second connecting member by a third articulation cooperating with the third cooperation element, the second connecting member being configured so as to move the at least one shutter flap towards the deployed position when the at least one transmission member is moved in said first direction and towards the retracted position when the at least one transmission member is moved in said second direction.

2. The thrust reverser according to claim 1, wherein said first connecting member comprises at least one drive connecting rod, the at least one drive connecting rod being articulated to the at least one transmission member and to the fixed outer structure.

3. The thrust reverser according to claim 2, wherein the at least one drive connecting rod is a telescopic connecting rod.

4. The thrust reverser according to claim 3, wherein the telescopic connecting rod comprises a guide part and a sliding part within an inner housing of the guide part, the telescopic connecting rod being articulated to the at least one transmission member by the guide part, the telescopic connecting rod being articulated to the fixed outer structure by a distal end of the sliding part.

5. The thrust reverser according to claim 1, wherein the at least one shutter flap comprises a front end and the rear end configured so that said fluid flow circulates in the duct in a direction from said front end towards said rear end in the direct thrust configuration.

6. The thrust reverser according to claim 1, wherein said second connecting member comprises at least one connecting rod, the at least one connecting rod being articulated to the at least one transmission member and to the at least one shutter flap.

7. The thrust reverser according to claim 1, wherein the control mechanism is configured so that the at least one transmission member is contained within a space delimited radially inwards by the at least one shutter flap in the direct thrust configuration, in the thrust reversal configuration and during a switch from one of these configurations to the other.

8. The thrust reverser according to claim 1, wherein the first articulation and the second articulation define the first transmission direction, the first articulation and the third articulation define the second transmission direction, and
wherein, in the thrust reversal configuration:
the first transmission direction is substantially parallel to a direction along which the first connecting member extends, and/or
the second transmission direction is substantially parallel to a direction along which the second connecting member extends.

9. The thrust reverser according to claim 1, further comprising movable cascade vanes.

10. A propulsion unit for an aircraft, said propulsion unit comprising the thrust reverser according to claim 1.

* * * * *